United States Patent [19]

Mooring

[11] Patent Number: 5,667,152
[45] Date of Patent: Sep. 16, 1997

[54] SAFETY SYSTEM FOR A WOOD CHIPPER

[76] Inventor: Jonathan E. Mooring, 9944 Bon Vue Dr., El Cajon, Calif. 92021

[21] Appl. No.: 453,899

[22] Filed: May 30, 1995

[51] Int. Cl.⁶ .................................................. A01F 21/00
[52] U.S. Cl. ....................... 241/37.5; 83/58; 83/DIG. 1; 241/101.76
[58] Field of Search ..................... 83/DIG. 1, 58; 241/37.5, 101.76

[56] References Cited

U.S. PATENT DOCUMENTS

| | | | |
|---|---|---|---|
| 3,861,602 | 1/1975 | Smith | 241/101.76 X |
| 4,442,877 | 4/1984 | Uitermarkt | 241/101.76 X |
| 5,020,579 | 6/1991 | Strong | 241/101.76 X |
| 5,148,053 | 9/1992 | Dubois, III | 83/DIG. 1 X |
| 5,198,702 | 3/1993 | McCollough et al. | 307/326 X |
| 5,272,946 | 12/1993 | McCollough et al. | 83/DIG. 1 X |

*Primary Examiner*—Rinaldi I. Rada
*Assistant Examiner*—Boyer Ashley
*Attorney, Agent, or Firm*—Charles C. Logan

[57] ABSTRACT

A safety system for a wood chipper having an elongated delivery chute into which a person would load tree branches, limbs and tree trunks. A metal sensor is mounted in the chute intermediate its front and rear ends and is oriented to detect any metal passing through the passageway of the chute. A gate is mounted inside the chute and it is normally in an open position. The gate is located at a position between the metal sensor and the rear of the chute. When the metal sensor detects metal passing by it sends a signal to a hydraulic cylinder that rapidly closes the gate to block the passage way of the chute. The system requires that the person loading the material into the chute wear a pair of metal impregnated gloves. Some wood chippers have rollers mounted adjacent the rear end of the chute for pulling the tree branches, limbs and tree trunks into the inlet port of the housing containing rotating cutting blades. In this type of wood chipper, the metal sensor would send a signal immediately to reverse the direction of rotation of the rollers upon sensing metal passing thereby and prevent the person's hand and arm from being drawn into the cutting blades.

10 Claims, 1 Drawing Sheet

SAFETY SYSTEM FOR A WOOD CHIPPER

BACKGROUND OF THE INVENTION

The invention relates to wood chippers utilized to cut up tree branches, limbs and tree trunks. More specifically, the invention relates to a novel safety system for the wood chipper that will prevent a person feeding material into the wood chipper from being injured by the wood chippers rotating cutting blades.

The wood chippers presently out on the market and in use are extremely dangerous to persons feeding tree branches, limbs and tree trunks into them. The speed at which the branches and limbs are pulled into the housing containing the cutting structure is frightening. The chips produced by the cutting blades are ejected like projectiles at an extremely high rate of speed. The feeding of a nail or other piece of metal with the material being delivered into the chute of the wood chipper can have disastrous results. The metal can be projected back toward the worker in the manner of a bullet or piece of shrapnel. Each year workers using the wood chippers are reporting serious injuries. These workers can lose fingers, hands, arms or suffer even more severe injuries.

It is an object of the invention to provide a novel safety system for a wood chipper that would prevent the mutilation type injuries to workers loading tree branches, limbs and tree trunks into the front of the chute of the wood chipper.

It is an object of the invention to provide a novel safety system for a wood chipper that incorporates a gate in the chute that can be automatically and rapidly closed upon the detection of metal passing through the chute, thereby closing access to the dangerous cutting blades.

It is another object of the invention to provide a novel safety system for a wood chipper that is economical to manufacture and market.

It is an additional object of the invention to provide a novel safety system for a wood chipper that can be retrofitted into existing wood chipper.

It is a further object of the invention to provide a novel safety system for a wood chipper that requires a worker loading tree branches, limbs and tree trunks into the front end of the chute to wear a pair of gloves made of metal impregnated material.

SUMMARY OF THE INVENTION

The novel safety system for a wood chipper incorporates a metal sensor in the delivery chute of the wood chipper into which tree branches, limbs and tree trunks are delivered. A necessary component of the system is the requirement that the worker wear a pair of gloves made of metal impregnated material whose presence will be automatically identified by a metal sensor if the person's hand is being drawn into the chute.

In one embodiment of the system, the metal sensor will transmit a signal immediately to structure controlling a hydraulic cylinder that actuates a gate mounted in the passageway of the chute. The signal will cause the gate to be slammed downwardly thereby closing the passageway and prevent the worker from being dragged into the sharp cutting blades. Since most chutes are made of metal material, it is necessary that area upon which the metal sensor is being focused be made of nonmetallic material. This requires a panel to be mounted in that particular wall of the chute. When a 360 degree coil loop metal sensor is used, it is necessary that all of the surrounding walls be made of non-metallic material.

An alternative safety system is used with a disc style wood chipper. This type of wood chipper has a pair of vertically spaced horizontal rollers mounted adjacent the rear end of the delivery chute. These rollers are powered to rotate toward each other and draw the tree branches, limbs and tree trunks into the housing in which the cutting blades are mounted. In this embodiment, the metal sensor would send a signal immediately to the power source structure that is driving the rollers. The direction of rotation of each of the rollers would be reversed so that the material would be withdrawn rearwardly toward the front end of the chute. This again would prevent a worker's limbs from being dragged into the dangerous cutting zone.

DESCRIPTION OF THE PREFERRED EMBODIMENT

Figure 1:
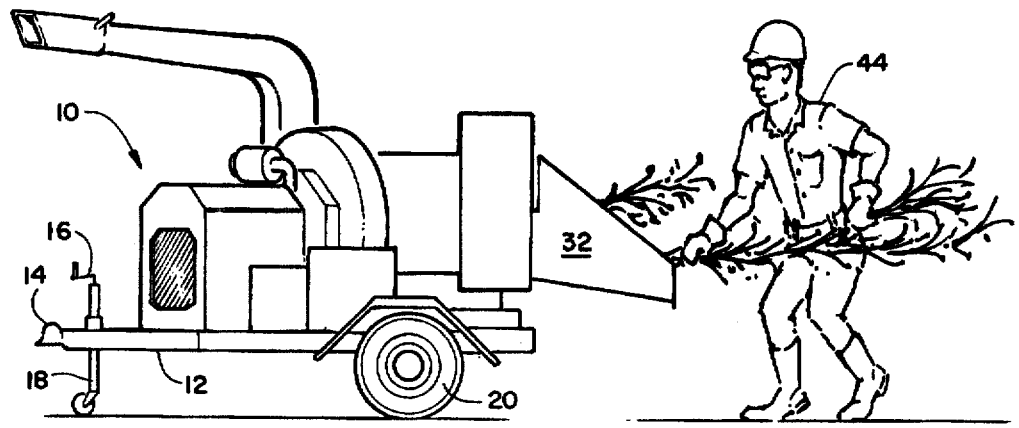
FIG. 1 is a side elevation view of a wood chipper and worker incorporating the novel safety system.
Figure 2:
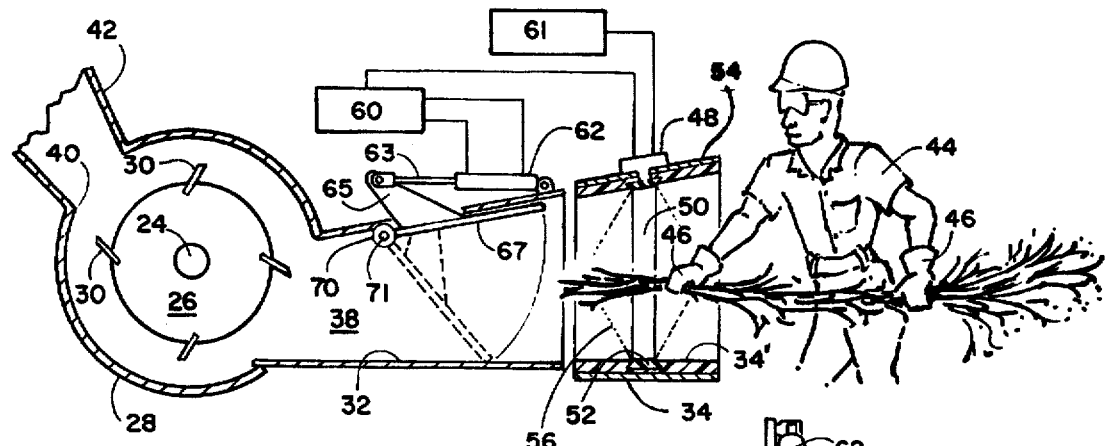
FIG. 2 is a schematic side elevation view illustrating the novel structure and components that are necessary in the delivery chute and also the gloves that the workers are required to wear.
Figure 3:
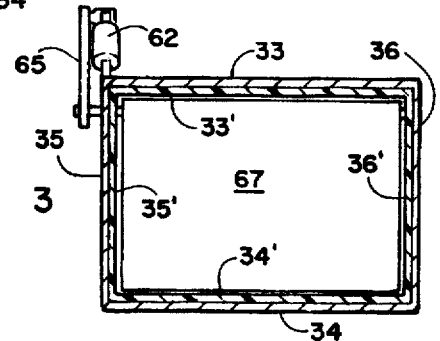
FIG. 3 is a front elevation view of the delivery chute when the gate has been closed and thereby preventing tree branches, limbs and trunks to be drawn into the wood chipper.

A novel safety system for a drum-type wood chipper will now be described by referring to FIGS. 1–3 of the drawing. The drum-type wood chipper is generally designated numeral 10. It has a support frame 12 having a hitch 14 mounted on its front end. Handle 16 is used to raise and lower the dolly 18. Frame 12 is supported by tires 20 with conventional structure thereby making it trailerable.

An engine is mounted in housing 22 that is connected by a conventional drive train to driveshaft 24 upon which mandrel drum 26 is mounted. Mandrel drum 26 is mounted in housing 28 and it has a plurality of blades 30 extending outwardly from its circumference. Chipper 10 has a delivery chute 32 for feeding tree branches, limbs and tree trunks to the cutting mandrel drum.

Delivery chute 32 has a top wall 33, a bottom wall 34, a left side wall 35 and a right side wall 36. The rear end of delivery chute 32 is located adjacent inlet port 38 of housing 28. An outlet port 40 is also located adjacent the rear end of housing 28 and it connects with a chip dispenser boom assembly 42.

Worker 44 has a pair of gloves 46 made of metal impregnated material. A metal sensor 48 that may be a 360 degree loop metal detector is mounted in delivery chute 32. All the side walls in this area have to be made of non-metallic panels 33', 34', 35' and 36'. In this embodiment, the metal sensor could be impregnated in a closed loop rubber band 50 that would mate with dovetail slots 52 in the respective non-metallic panels. The structure of the non-metallic panels would normally be reinforced by bracing structure 54. Dash lines 56 describe a metal detection zone and the manner in which the metal sensor will transmit its signals toward the respective walls of the delivery chute.

Upon sensing metal in its detection zone, metal sensor 48 will send a signal to hydraulic motor 60 that would actuate hydraulic cylinder 62 causing piston rod 63 to be drawn therein. The forward end of piston rod 63 is pivotally connected to bracket 65 that is rigidly secured to gate 67. Gate 67 is secured at its forward end by a cylindrical member 70 that is mounted on a shaft 71. The rapid withdraw of piston rod 63 into hydraulic cylinder 62 will cause a rapid closing of gate 67 thereby blocking the passageway of the chute. In this embodiment engine 22 can still be rotating mandrel drum 26.

Figure 4:
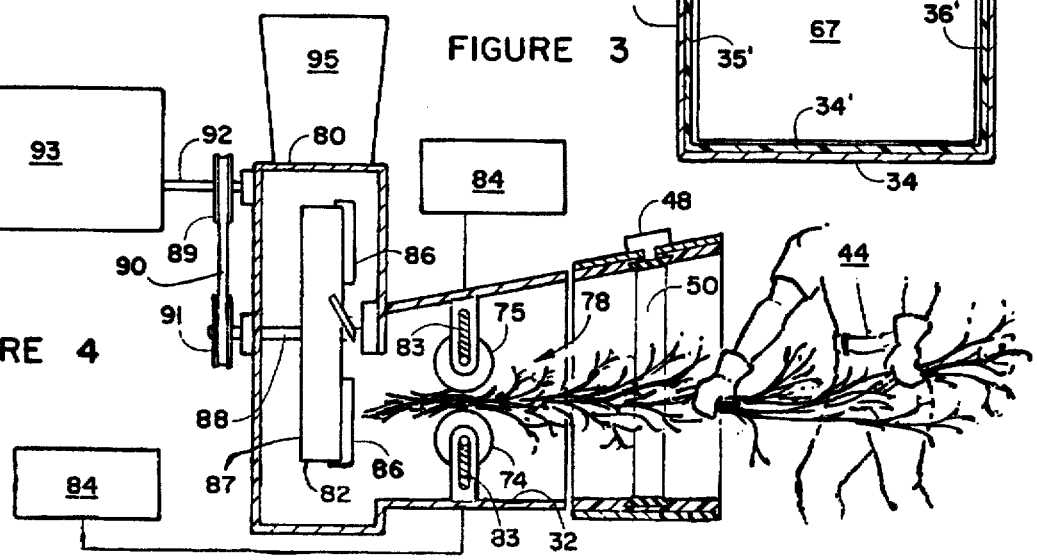
FIG. 4 is a schematic illustration of a disc-type wood chipper illustrating the structure and components that would be utilized for its safety system.

A wood chipper of the disc-type is schematically illustrated in FIG. 4 incorporating the novel safety system. It would have a similar chute 32 along with a metal sensor 48 and its accompanying non-metallic panel structure walls. A pair of vertically spaced rollers 74 and 75 are mounted adjacent the rear end of delivery chute 32 for pulling the tree branches, limbs and tree trunks toward the inlet port 78 of the housing 80 within which disc 82 is mounted. Conventional structure is used for supporting the rollers 74 and 75 and they it may incorporate springs 83 that normally the draw the top roller downwardly to pinch the wood material between them. These rollers are powered by a motor or engine 84. Disc 82 has a plurality of blades 86 circumferentially spaced on its front surface 87. Disc 82 is mounted on a shaft 88 having a pulley 89 adjacent its one end. Belt 90 passes around pulley 89 and pulley 91 mounted on the driveshaft 92 of an engine 93. Housing 80 would have an outlet port 95 that would be connected to a chip dispenser boom 42 such as illustrated in FIG. 2. When metal sensor 48 detects a metal particle or the gloves 86 of the worker, a signal is sent to reverse the power to rollers 74 and 75 thereby causing them to rotate in the opposite direction and pull the material being passed through the delivery chute toward the worker.

What is claimed is:

1. A safety system for a wood chipper comprising:

a mandrel drum mounted on a drive shaft for rotational motion, said mandrel drum having a circumferential surface having a plurality of blades directed outwardly therefrom; said drum being mounted in a housing; said housing having an inlet port and an outlet port;

an engine connected to the drive shaft of said mandrel drum;

an elongated material delivery chute having a front end, a rear end, a top wall, a bottom wall, a left side wall, and a right side wall that define a passageway for tree branches, limbs and tree trunks; the rear end of said wood material delivery chute being positioned adjacent the inlet port of said mandrel housing;

at least one glove made of metal impregnated material that would be worn by a person loading tree trunks, tree branches and tree limbs into the front end of said chute;

a metal sensor mounted in said chute intermediate its front and rear ends and being directed across said passageway to detect said metal impregnated glove or any other metal passing through the passageway of said chute; said metal sensor being directed toward a non-metallic panel in one of the walls of said chute;

a gate mounted inside said chute that is normally in an open position that allows tree branches and limbs to travel through the passageway of said chute; said gate being located at a position between said metal sensor and the rear end of said chute; and means for closing said gate to block the passageway of said chute when said metal sensor detects said metal impregnated glove or any other metal passing by it and thereby preventing injury to a person feeding wood material into said chute.

2. A safety system for a wood chipper comprising:

a mandrel drum mounted on a drive shaft for rotational motion, said mandrel drum having a circumferential surface having a plurality of blades directed outwardly therefrom; said drum being mounted in a housing; said housing having an inlet port and an outlet port;

an engine connected to the drive shaft of said mandrel drum;

an elongated material delivery chute having a front end, a rear end, a top wall, a bottom wall, a left side wall, and a right side wall that define a passageway for tree branches, limbs and tree trunks; the rear end of said wood material delivery chute being positioned adjacent the inlet port of said mandrel housing;

at least one glove made of metal impregnated material that would be worn by a person loading tree trunks, tree branches and tree limbs into the front end of said chute;

a metal sensor mounted in said chute intermediate its front and rear ends and being directed across said passageway to detect said metal impregnated glove or any other metal passing through the passageway of said chute; said metal sensor being a 360 degree coil loop detector;

a gate mounted inside said chute that is normally in an open position that allows tree branches and limbs to travel through the passageway of said chute; said gate being located at a position between said metal sensor and the rear end of said chute; and means for closing said gate to block the passageway of said chute when said metal sensor detects said metal impregnated glove or any other metal passing by it and thereby preventing injury to a person feeding wood material into said chute.

3. A safety system for a wood chipper as recited in claim 2 wherein said 360 degree coil loop is incorporated in a closed loop rubber band.

4. A safety system for a wood chipper as recited in claim 3 wherein said chute has a top panel, a bottom panel, a left side panel and a right side panel all made of non-metallic material that is positioned in the passageway of said chute so that it surrounds said 360 degree coil loop.

5. A safety system for a wood chipper comprising:

rotating cutting blade means for cutting branches, limbs and tree trunks into wood chips, said rotating cutting blade means mounted in a housing having an inlet port and an outlet port;

an elongated material delivery chute having a front end, a rear end, a top wall, a bottom wall, a left side wall and a right side wall that define a passageway for tree branches, limbs and tree trunks; the rear end of said wood material delivery chute being positioned adjacent the inlet port of said housing;

roller means mounted adjacent the rear end of said material delivery chute for pulling tree branches, limbs and tree trunks into the inlet port of the housing containing said rotating cutting blade means, said roller means being driven by a power source that can reverse the direction of rotation of said roller means and thereby pull the tree branches, limbs and tree trunks back toward the front end of said chute;

at least one glove made of metal impregnated material that would be worn by a person loading tree trunks, tree branches and tree limbs into the front end of said chute;

a metal sensor mounted in said chute intermediate its front and rear end and being directed across said passageway to detect said metal impregnated glove or any other metal passing through the passageway of said chute; said metal sensor being directed toward a non-metallic panel in one of the walls of said chute; said metal sensor being electronically connected to the power source for said roller means so that when metal is detected passing by said metal sensor a signal will be sent to reverse the direction of rotation of said roller means.

6. A safety system for a wood chipper as recited in claim 5 wherein said rotating cutting blade means comprises a circular disc having a front surface having a plurality of angularly spaced blades, said disc being rigidly mounted on a shaft that is connected to said power source.

7. A safety system for a wood chipper as recited in claim 5 wherein said roller means comprises a pair of elongated rollers each having a longitudinal axis, said rollers being vertically spaced with respect to each other and having their respective axes oriented horizontally and also parallel to each other.

8. A safety system for a wood chipper comprising:

rotating cutting blade means for cutting branches, limbs and tree trunks into wood chips, said rotating cutting blade means mounted in a housing having an inlet port and an outlet port;

an elongated material delivery chute having a front end, a rear end, a top wall, a bottom wall, a left side wall and a right side wall that define a passageway for tree branches, limbs and tree trunks; the rear end of said wood material delivery chute being positioned adjacent the inlet port of said housing;

roller means mounted adjacent the rear end of said material delivery chute for pulling tree branches, limbs and tree trunks into the inlet port of the housing containing said rotating cutting blade means, said roller means being driven by a power source that can reverse the direction of rotation of said roller means and thereby pull the tree branches, limbs and tree trunks back toward the front end of said chute;

at least one glove made of metal impregnated material that would be worn by a person loading tree trunks, tree branches and tree limbs into the front end of said chute;

a metal sensor mounted in said chute intermediate its front and rear end and being directed across said passageway to detect said metal impregnated glove or any other metal passing through the passageway of said chute; said metal sensor being a 360 degree coil loop detector; said metal sensor being electronically connected to the power source for said roller means so that when metal is detected passing by said metal sensor a signal will be sent to reverse the direction of rotation of said roller means.

9. A safety system for a wood chipper as recited in claim 8 wherein said 360 degree coil loop is incorporated in a closed loop rubber band.

10. A safety system for a wood chipper as recited in claim 9 wherein chute has a top panel, a bottom panel, a left side panel and a right side panel all made of non-metallic material that is positioned in the passageway of said chute so that it surrounds said 360 degree coil loop.

* * * * *